United States Patent
Herring et al.

(10) Patent No.: US 9,898,126 B2
(45) Date of Patent: Feb. 20, 2018

(54) USER DEFINED ACTIVE ZONES FOR TOUCH SCREEN DISPLAYS ON HAND HELD DEVICE

(71) Applicant: Toshiba Global Commerce Solutions Holdings Corporation, Tokyo (JP)

(72) Inventors: Dean Frederick Herring, Youngsville, NC (US); Brad M. Johnson, Raleigh, NC (US); Jeffrey Smith, Raleigh, NC (US); Seth Teeples, Cary, NC (US)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 14/674,380

(22) Filed: Mar. 31, 2015

(65) Prior Publication Data
US 2016/0291764 A1    Oct. 6, 2016

(51) Int. Cl.
*G06F 3/041* (2006.01)
*G06F 3/0488* (2013.01)

(52) U.S. Cl.
CPC ........ *G06F 3/0416* (2013.01); *G06F 3/04886* (2013.01); *G06F 2200/1614* (2013.01)

(58) Field of Classification Search
CPC ................. G06F 3/0416; G06F 3/0415; G06F 2203/04808; G06F 3/0488; G06F 2203/04806
See application file for complete search history.

(56) References Cited

U.S. PATENT DOCUMENTS

| 5,734,875 A | * | 3/1998 | Cheng ..................... G06T 3/606 345/501 |
| 6,011,550 A | * | 1/2000 | Capps ................... G06F 3/0481 705/25 |
| 6,137,468 A | * | 10/2000 | Martinez ............... G06F 1/1616 345/649 |

(Continued)

FOREIGN PATENT DOCUMENTS

CN          1641538 A       7/2005

OTHER PUBLICATIONS

Schwarz, J. et al. "Probabilistic Palm Rejection Using Spatiotemporal Touch Features and Iterative Classification." CHI '14 Proceedings of the SIGCHI Conference on Human Factors in Computing Systems, 2014, pp. 2009-2012.

(Continued)

*Primary Examiner* — Mihir K Rayan
(74) *Attorney, Agent, or Firm* — Coats & Bennett, PLLC (57) ABSTRACT

An application program installed in a hand held computing device such as a tablet computer presents a graphical user interface (GUI) on a touch screen display and receives touch input signals from the touch screen display. When an unintentional touch event is detected, the application switches from an active mode to a configuration mode. In the configuration mode, graphical tools are displayed on the touch screen display to enable a user to define or adjust the active zone of the touch screen display so as to exclude the area of the touch screen display touched by the hand that is grasping the hand held device. Interactive elements in the GUI are then rearranged so that the interactive elements are within the newly defined active zone.

14 Claims, 6 Drawing Sheets

(56) References Cited

U.S. PATENT DOCUMENTS

| | | | | |
|---|---|---|---|---|
| 6,204,845 B1* | 3/2001 | Bates | | G06F 3/0481 |
| | | | | 715/788 |
| 6,597,384 B1* | 7/2003 | Harrison | | G06F 1/1626 |
| | | | | 345/169 |
| 7,304,638 B2 | 12/2007 | Murphy | | |
| 7,576,733 B2 | 8/2009 | Tremaine et al. | | |
| 8,314,775 B2 | 11/2012 | Westerman et al. | | |
| 8,466,896 B2 | 6/2013 | Stephanick et al. | | |
| 8,717,327 B2 | 5/2014 | Hering | | |
| 8,760,426 B1 | 6/2014 | Strand et al. | | |
| 2008/0119237 A1* | 5/2008 | Kim | | G06F 3/0481 |
| | | | | 455/566 |
| 2008/0291225 A1* | 11/2008 | Arneson | | G06F 3/011 |
| | | | | 345/698 |
| 2009/0228792 A1 | 9/2009 | van Os et al. | | |
| 2009/0327975 A1 | 12/2009 | Stedman | | |
| 2011/0012855 A1 | 1/2011 | Yeh et al. | | |
| 2011/0063491 A1* | 3/2011 | Kim | | G06F 3/005 |
| | | | | 348/333.01 |
| 2011/0169749 A1 | 7/2011 | Ganey et al. | | |
| 2011/0316807 A1* | 12/2011 | Corrion | | G06F 3/0416 |
| | | | | 345/174 |
| 2012/0023459 A1* | 1/2012 | Westerman | | G06F 3/03547 |
| | | | | 715/863 |
| 2012/0032979 A1* | 2/2012 | Blow | | G06F 1/1626 |
| | | | | 345/647 |
| 2012/0038571 A1* | 2/2012 | Susani | | G06F 3/0416 |
| | | | | 345/173 |
| 2012/0119999 A1* | 5/2012 | Harris | | G06F 3/04886 |
| | | | | 345/169 |
| 2013/0212535 A1 | 8/2013 | Kim | | |
| 2013/0234982 A1* | 9/2013 | Kang | | G06F 3/044 |
| | | | | 345/174 |
| 2013/0265269 A1 | 10/2013 | Sharma et al. | | |
| 2013/0300672 A1 | 11/2013 | Griffin | | |
| 2013/0307801 A1 | 11/2013 | Nam | | |
| 2014/0092140 A1 | 4/2014 | Wadhwa et al. | | |
| 2014/0306905 A1* | 10/2014 | Kim | | G06F 3/04886 |
| | | | | 345/173 |
| 2015/0062206 A1* | 3/2015 | Osborne | | G09G 5/00 |
| | | | | 345/698 |
| 2015/0084877 A1* | 3/2015 | Wang | | G06F 3/04883 |
| | | | | 345/173 |
| 2016/0162149 A1* | 6/2016 | Lee | | G06F 1/1694 |
| | | | | 715/835 |

OTHER PUBLICATIONS

Karlson, A. et al. "ThumbSpace: Generalized One-Handed Input for Touchscreen-Based Mobile Devices." INTERACT 2007, LNCS 4662, Part I, IFIP International Federation for Information Processing 2007, pp. 324-338.

\* cited by examiner

USER DEFINED ACTIVE ZONES FOR TOUCH SCREEN DISPLAYS ON HAND HELD DEVICE

TECHNICAL FIELD

The present invention relates generally to touch screens for handheld computing devices and, more particularly, to touch screens for handheld devices with palm rejection capabilities.

BACKGROUND

Advances in technology have led to a proliferation of small, handheld computing devices such as smart phones, personal digital assistants (PDAs), and tablet computers. Such devices typically include a large touch screen that functions as both a display and input device. In order to maximize the surface area of the touch screen, the touch screen typically extends close to the side edges of the device. A graphical user interface is displayed on the touch screen. The user interacts with the graphical user interface by touching the screen with a stylus, pen or finger. A processor detects the position of the touch input and determines an appropriate action to take based upon position of the touch and the position of elements in the graphical user interface. Multi-touch screens are capable of detecting and tracking multiple, simultaneous touch inputs such as sliding two fingers on a touch screen. The multi-touch gestures are then translated into commands to be executed by the processor.

Handheld tablets are frequently used as point of sale (POS) terminals in retail settings. When using a tablet in a retail store as a POS device, the user typically holds the device in one hand and uses the opposite hand for interacting with the touch screen. It is common for the thumb or fingers on the hand holding the device to inadvertently touch the touch screen. Such unintentional touch inputs by the user may cause unexpected results, for example, where a user unintentionally touches an interactive element in the graphical user interface.

Palm rejection technology is known for detecting unintentional touches and defining an active zone on the touch screen display that excludes the area where unintentional touch input occurs. This excluded area is referred to as the rejection zone. Touch inputs within the rejection zone are ignored by the application. Currently, there is no convenient method of enabling a user to define the active zone of the display in a way that accommodates changes in the way that the tablet is held by the user.

DETAILED DESCRIPTION

The present disclosure relates to methods and apparatus for defining an active zone of a touch screen display to exclude areas that are touched unintentionally or touched by a hand that is holding the tablet. An application program installed in the hand held device presents a graphical user interface (GUI) on the touch screen display and receives touch input signals from the touch screen display. The application program includes an active mode and a configuration mode. In the active mode, the user can use the application to perform task for which the application is designed. As one example, the hand held device may be used as a POS terminal in a POS system and execute POS application.

When an unintentional touch event is detected, the application switches from an active mode to a configuration mode. In the configuration mode, graphical tools are displayed on the touch screen display to enable a user to define or adjust the active zone of the touch screen display so as to exclude the area of the touch screen display touched by the hand that is grasping the hand held device. Interactive elements in the GUI are then rearranged so that the interactive elements are within the newly defined active zone. After returning to the active mode, touch input signals in the zone outside of the active zone, referred to herein as the rejection zone, are ignored by the application.

Figure 1A:
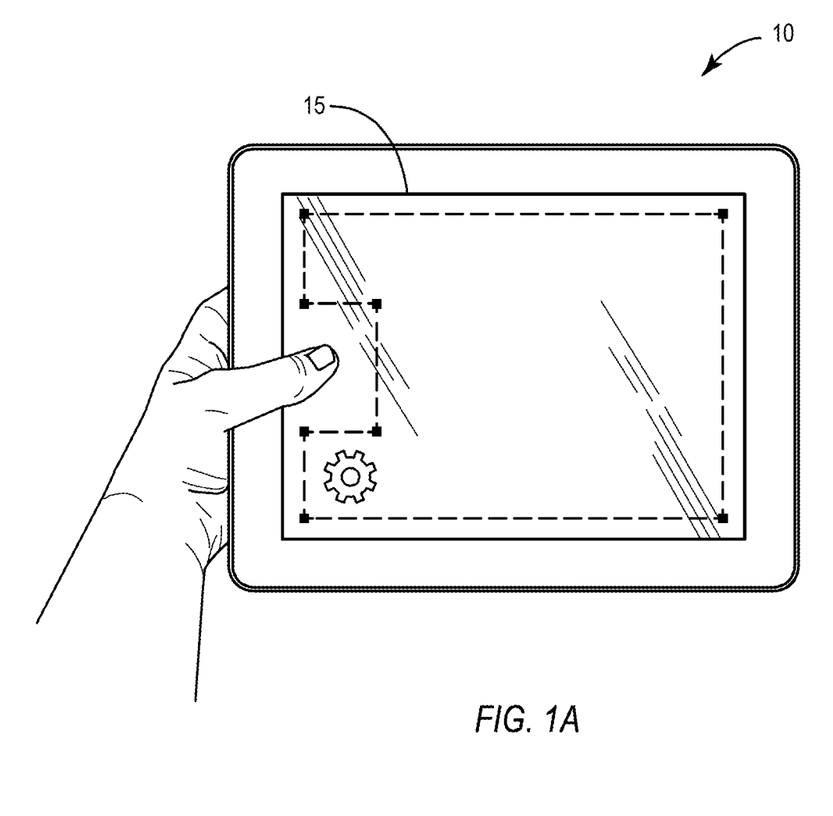
FIG. 1A illustrates a hand held device with a touch screen display. The active zone is displayed on the touch screen display.
Figure 1B:
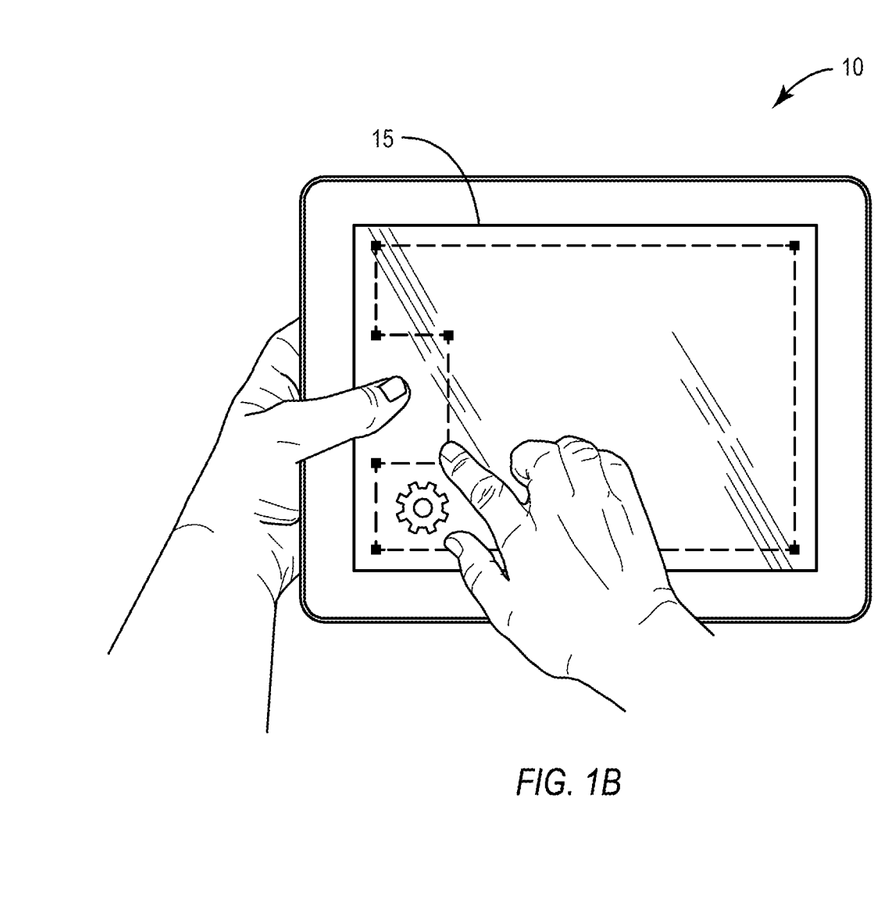
FIGS. 1B and 1C illustrates the user adjusting the active zone of the touch screen display.
Figure 1C:
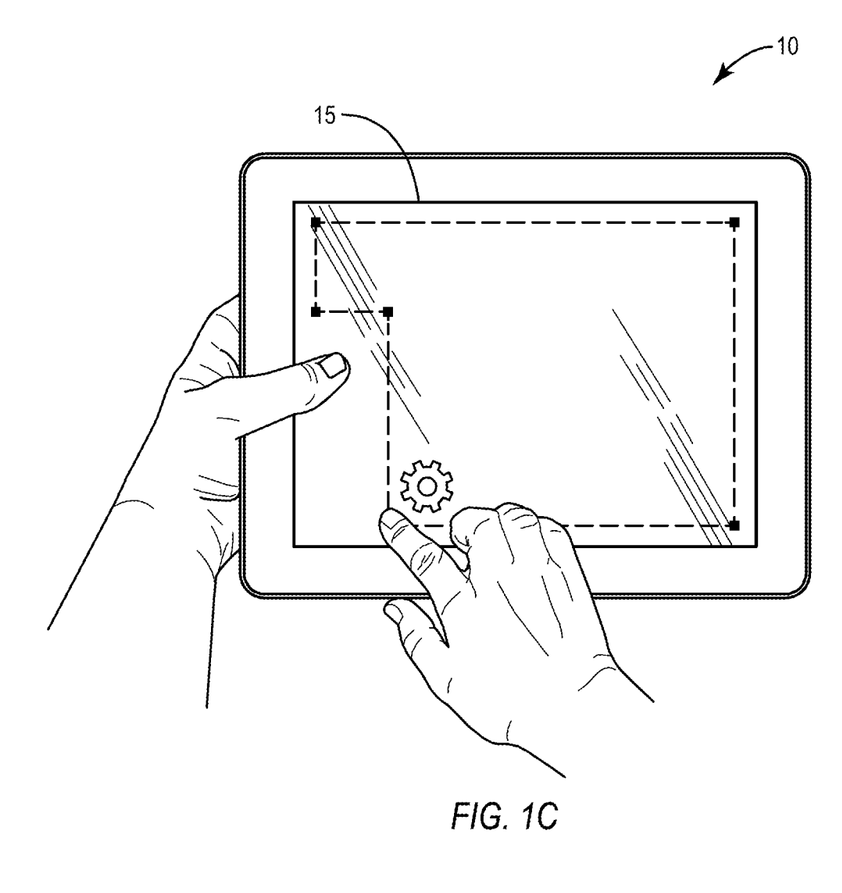

FIG. 1 illustrates an electronic device 10 according to one exemplary embodiment. The electronic device 10 includes a touch screen display 15. In the exemplary embodiment shown in FIG. 1A-1C, the electronic device 10 comprises a tablet computer. It will be appreciated that methods and techniques herein described are not limited to use in tablet computers but may be used in other types of electronic devices including smart phones, personal digital assistants (PDAs), laptop computers, etc.

In FIG. 1A, the electronic device 10 is held in the user's left hand with the user's thumb touching the left side of the touch screen. Using palm rejection technology, the electronic device 10 detects the user's thumb and enters into a configuration mode. The palm rejection algorithm implemented by the electronic device 10 defines an active zone which is displayed on the touch screen display 15 as a dotted line. The active zone excludes the area where the user's thumb is resting against the touch screen display 15. The excluded area is referred to herein as the rejection zone. In the configuration mode, the user is given the opportunity to adjust the active zone of the touch screen display 15.

FIGS. 1B and 1C illustrate how the active zone of the touch screen display 15 is adjusted in one exemplary embodiment. The border of the active zone displayed on the touch screen display 15 includes handles, which are depicted as squares. The handles can be touched and dragged to resize and/or reshape the active zone. FIG. 1B illustrates the user touching one handle on the border with a finger on the user's right hand. FIG. 1C shows the user dragging the handle down to change the area of the active zone. The new active zone, shown in FIG. 1C, excludes a generally rectangular area along the left side of the touch screen display 15 where the user's thumb is touching the touch screen display 15.

After the active zone is defined, the electronic device 10 rearranges the interactive elements of the graphical user interface displayed on the touch screen display 15 so that the interactive elements are within the active zone. Thus, in the example shown in FIGS. 1A-1C, an interactive element in the lower left corner of the touch screen display 15 in FIG. 1A is moved into the new active zone shown in FIG. 1C. Information may still be displayed to the user in the rejection zone but any touch input signals corresponding to the rejection zone will be ignored by the electronic device 10.

Figure 2:
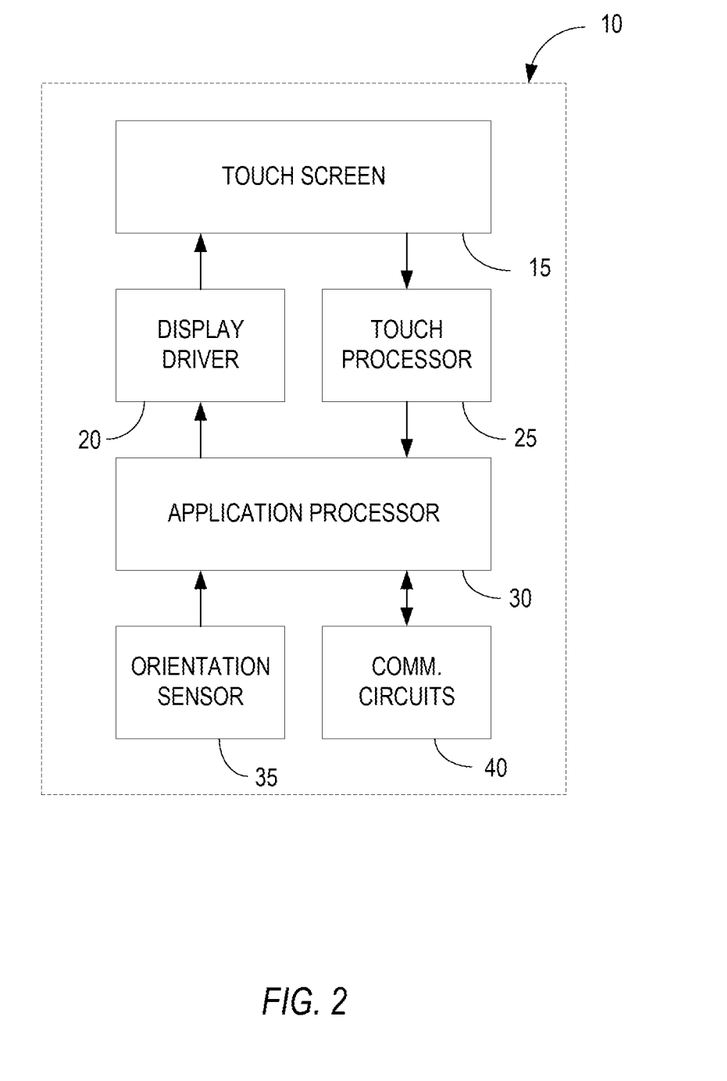
FIG. 2 illustrates the main functional components the hand-held device according to one exemplary embodiment.

FIG. 2 illustrates the main functional components of the electronic device 10 according to one embodiment of the disclosure. The electronic device 10 comprises a touch screen display 15, a display driver 20, a touch processor 25, an application processor 30, an orientation sensor 35, and a memory 40. The electronic device 10 may include other components that are not material to the present disclosure. For example, the electronic device 10 may include one or more communication circuits, such as a cellular transceiver (e.g., WCDMA LTE), wireless local area network (WLAN) transceiver (e.g., Wi-Fi), or short range wireless transceiver (e.g., Bluetooth).

The touch screen display 15 may comprise a liquid crystal display (LCD), a light emitting diode (LED) display, or active matrix organic LED (AMOLED) display. The display may incorporate either resistive or capacitive touch sensors, or ultrasonic touch sensors. The particular type of display technology or touch sensing technology is not a material aspect of the invention. Any type of touch screen display 15 may be used that is capable of receiving and displaying data and generating touch input signals.

The display driver 20 comprises an integrated circuit and/or discrete logic circuit which provides an interface between the application processor 30 and touch screen display 15 for outputting image data from the application processor 30 to the touch screen display 15. The display driver 20 receives image data from the application processor 30 to be displayed on the touch screen display 15. The display driver 20 generates drive signals with suitable voltage, current, timing, etc. for the touch screen display 15.

The touch processor 25 comprises an integrated circuit and/or discrete logic circuit that functions as an interface between the touch screen display 15 and application processor 30 for inputting touch input signals to the application processor 30. The touch processor 25 receives raw signals from the touch screen display 15 related to a touch event. The touch processor 25 performs digital signal processing such as filtering and noise reduction. The processed touch input signals are then input to the application processor 30.

The application processor 30 comprises one or more microprocessors, microcontrollers, hardware circuits (e.g., discrete logic circuits and/or hardware registers), or a combination thereof. The application processor controls the overall operation of the electronic device 10 and executes user programs or applications stored in memory 40. A typical user application executed by the application processor 30 generates a graphical user interface (GUI) that is displayed on the touch screen display 15. The application processor 30 generates image data for displaying the GUI on the touch screen display 15. The image data is supplied to the display driver 20 which, as previously described, generates the drive signals for displaying the GUI. The application processor 30 also receives touch input signals from the touch processor 25 representing user input. The touch input signals may represent data or commands to be executed by the application processor 30.

The orientation sensor 35 comprises a sensing device for determining the orientation of the electronic device 10. The orientation sensor 35 may comprise a rotation sensor, accelerometer, inclinometer, or a combination thereof. Output signals generated by the orientation sensor 35 are input to the application processor 30. The application processor 30 uses the output signals from the orientation sensor 30 to determine the orientation of the electronic device 10. Based on the orientation, the application processor 30 may change the way that the GUI for the application program is displayed on the touch screen display 15. For example, the application processor 30 may rotate the graphical user interface on the touch screen display 15 depending on how the electronic device 10 is held.

Memory 40 stores program code and data used by the application processor 30 for operation. Memory 40 may comprise one or more discrete memory devices, or may be integrated with the application processor 30. Memory 40 may include both non-volatile and volatile memory devices. In general, computer programs and permanent data needed for operation are stored in a non-volatile memory, such as a read only memory (ROM) or flash memory. Temporary data may be stored in a random access memory (RAM).

Figure 3:
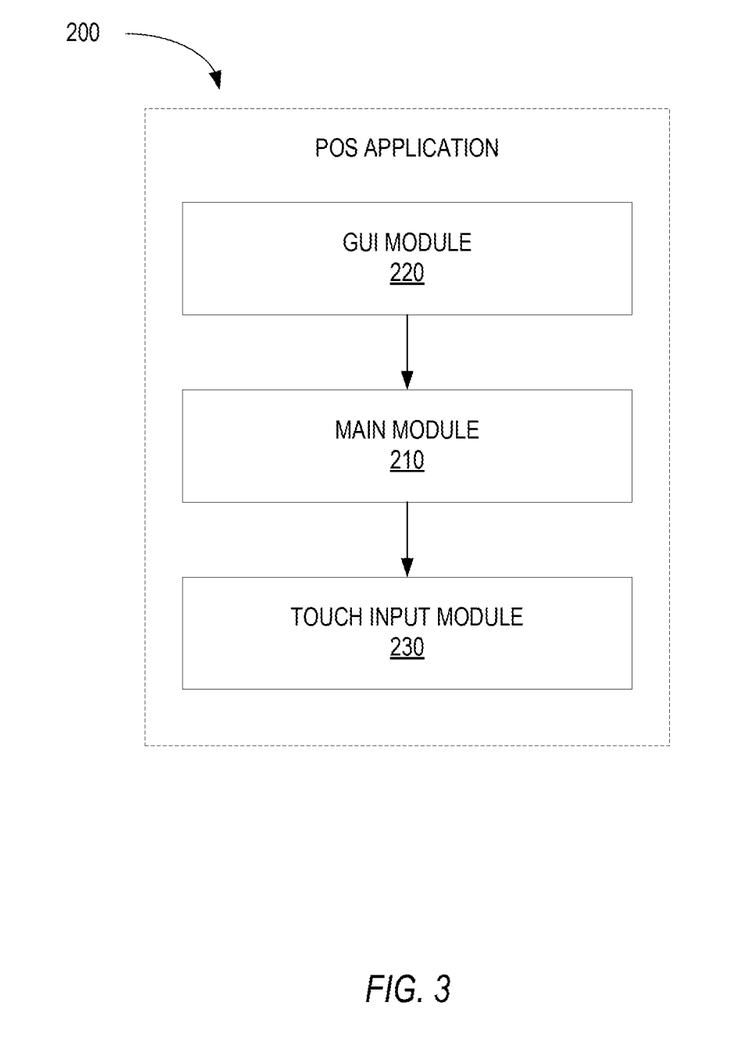
FIG. 3 illustrates the main functional components of a POS application for the hand-held device.

In one exemplary embodiment, the electronic device 10 is used as a point of sale (POS) terminal in a POS system. A POS application 200 is stored in memory 40 of the electronic device 10 and executed by the application processor 30. An exemplary POS application 200, shown in FIG. 4, comprises a main module 210, a graphical user interface (GUI) module, and a touch input module 230. The main module 210 comprises program code for handling sales transactions. For example, the main module may comprise program code for handling cash payments, check payments, credit card payments, product scanning, receipt printing, etc. The GUI module 220 coordinates with the main module 210 to generate the GUI that is displayed on the touch screen display 15. The touch input module 230 validates the touch input signals based on the currently defined active zone and passes the valid touch input signals to the main module 210 for processing. The valid touch input signals comprise touch input signals corresponding to touch events inside the currently defined active zone. Invalid touch input signals comprise touch input signals corresponding to touch events outside of the currently defined active zone.

The POS application 200 has two main modes of operation: an active mode and a configuration mode. The active mode includes two sub-modes: a full screen touch mode and a restricted touch mode. In the active mode, a user can use the POS application 200 to conduct sales transactions or other tasks for which the application program is designed. In the active mode, the GUI for the POS application 200 is displayed in the currently defined active zone. In the full screen mode, the entire display area of the touch screen display 15 is used. Thus, interactive elements of the GUI can be displayed anywhere on the touch screen display 15. In the restricted touch mode, the active zone comprises less than the total area of the touch screen display 15. In this mode, the POS application 200 displays interactive elements of the GUI only in the currently defined active zone. Interactive elements of the GUI are not displayed in the rejection zone. It will be appreciate, however, that the entire area of the touch screen display 15 may be used for displaying information even in the restricted mode. In the configuration mode, the user is presented with a graphical tool set comprising one or more graphical tools for defining the active zone on the touch screen display 15.

In one exemplary embodiment, the POS application 200 automatically switches from the active mode to the configuration mode when an unintentional touch event is detected. The unintentional touch event may be detected using conventional palm rejection technology. In general, the characteristics of a touch event are evaluated to determine whether the touch input is unintentional. Factors indicative of unintentional touch input include the size and shape of the contact area, minimal movement over a time period, or multiple contact points in close proximity. U.S. Patent Publication 2013/0265269 describes techniques for detection of unintentional touch inputs. This application is incorporated herein in its entirety by reference.

While in the configuration mode, the user is able to define or redefine the active zone using the graphical tool set displayed on the touch screen display 15. After the user has finished defining the area of the active zone, the POS application 200 returns to the active mode. The graphical user interface displayed in the configuration mode may include a virtual button or other graphical element that is touched by the user to indicate that the user is finished.

Figure 4:
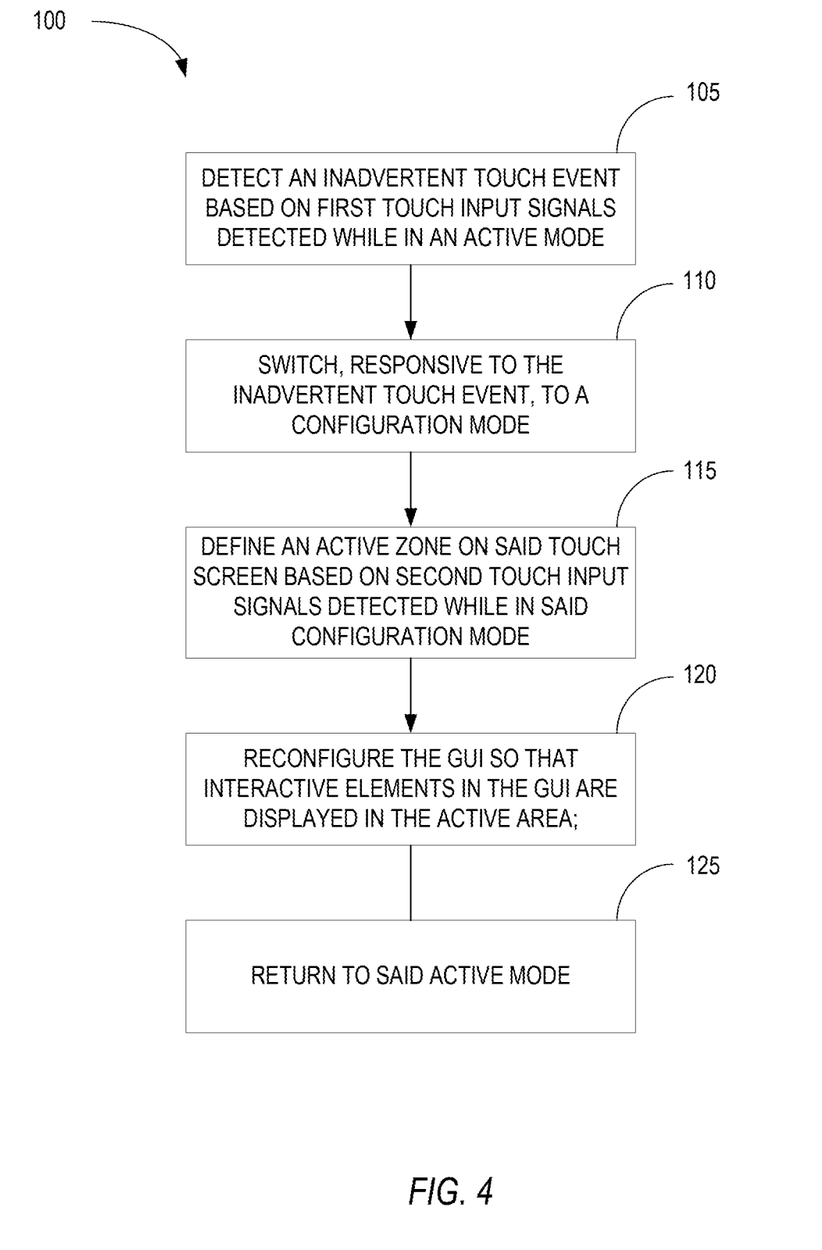
FIG. 4 illustrates an exemplary method of adjusting the active zone on a touch screen display for a hand held device.

FIG. 4 illustrates an exemplary method implemented by the electronic device. It is assumed that the electronic device 10 has a POS application 200 installed and executed by the application processor 30. The application processor 30 in the electronic device generates a GUI that is output to the touch screen display. The application processor 30 also receives touch input signals from the touch screen display 15. The POS application 200 executed by the application processor 30 has an active mode and a configuration mode as previously described.

The application processor 30 detects an inadvertent touch event based on first touch input signals detected while in an active mode (block 105). In response to detection of the inadvertent touch event, the application processor 30 switches to a configuration mode (block 110). During the configuration mode, the application processor 30 defines an active zone on the touch screen display 15 based on second touch input signals detected while in the configuration mode (block 115). In one embodiment, the application processor 30 displays a border on the touch screen display representing the active zone. The active zone initially displayed may be determined by the application processor 30 using conventional palm rejection techniques. While in the configuration mode, the user may drag the borders of the active zone to resize or reshape the active zone and the touch screen display 15 generates the second touch input signals responsive to the user's interactions with the touch screen display 15. The application processor 30 adjusts the borders or boundaries of the active zone responsive to these second input signals.

When the boundaries of the active zone are changed, interactive elements in the GUI that were previously within the active zone may be outside of the new active zone (e.g., in the rejection zone). Therefore, the application processor 30 rearranges the interactive elements in the graphical user interface so that the interactive elements are displayed in the newly defined active zone (block 120). The POS application 200 then returns to the active mode (block 125).

In one exemplary embodiment, the electronic device 10 detects an inadvertent touch event based on the presence of a user's hands or fingers in one area of the touch screen display for more than a predetermined period of time.

In one exemplary embodiment, the electronic device 10 presents a visual representation showing the boundary of the active zone of the touch screen display 15 while in the configuration mode. The electronic device may also display a set of graphical tools for resizing or reshaping the active zone. In one embodiment, the border displayed on the touch screen display 15 includes handles that can be touched and dragged to resize and/or reshape the active zone.

In some embodiments, the electronic device is configured to revert from a restricted touch mode in which the active zone comprises less than the total area of the display to a full screen touch mode when the touch screen display 15 is not being held for a predetermined period of time.

In some embodiments, the POS application 200 may be configured to store one or more active zones in memory 40. Multiple active zones defined for different context may be stored in memory 40. When the electronic device 10 is used by a single user, multiple active zones may be defined corresponding to different ways that the electronic device 10 is held by the user. For example, there may be a first active zone defined for use when the electronic device 10 is held in the user's left hand and a second active zone defined for use when the electronic device 10 is held in the user's right hand. Different active zones may also be defined for use depending on the orientation of the electronic device 10. Alternatively, the application may include code for transforming the currently defined active zone responsive to changes in the orientation of the electronic device 10.

When the electronic device 10 is used by multiple persons, multiple active zones may be defined for use by different users. The POS application 200 may require the user to enter the user's identity. The POS application 200 may then select the active zone based on the user's preferences. Multiple active zones may be defined for each user to accommodate holding the electronic device 10 in different hands or in different orientations.

While in an active mode, the POS application 200 may detect changes in the way that the electronic device 10 is held and automatically switch from one previously stored active zone to another. When a change is detected in the way that the electronic device 10 is held, the POS application 200 may automatically select a previously stored active zone. Varying the way that the electronic device 10 is held may help reduce fatigue and reduce the likelihood of cumulative muscular skeletal disorders.

The present disclosure provides a convenient method to enable a user to define the active zone on a touch screen display of a hand held computing device. Because different people have different anthropometric dimensions, the techniques herein described enable users to define an active zone that provides greater ease of use and/or comfort for the user.

What is claimed is:

1. An electronic device comprising:
   a touch screen display configured to display a GUI and to generate touch input signals responsive to touch events; and
   a processing circuit configured to:
   detect an inadvertent touch event based on first touch input signals detected while in an active mode;
   switch, responsive to the inadvertent touch event, to a configuration mode;
   define an active zone on said touch screen based on second touch input signals detected while in said configuration mode, wherein the active zone comprises less than the full display area of the touch screen;
   rearrange one or more interactive elements in the GUI so that interactive elements in the GUI are displayed in the active zone;
   return to said active mode;
   store two or more active zones in a memory of said electronic device;
   detect, while in the active mode, a change in how the electronic device is held; and
   automatically switch from a first previously stored active zone to a second previously stored active zone based detecting the change in how the electronic device is held.

2. The electronic device of claim 1 wherein the processing circuit is configured to detect the inadvertent touch event based on the first touch input signals by detecting a presence of a user's hands or fingers on one area of the touch screen for more than a predetermined period of time.

3. The electronic device of claim 1 wherein the processing circuit defines the active zone on said touch screen by:
   presenting a graphical tool set on said display, wherein said graphical tool set comprises a set of graphical tools for describing the active zone; and
   receiving said second touch input signals responsive to a user interacting with said graphical tools in said graphical tool set.

4. The electronic device of claim 3 wherein said graphical tool set is presented on the display by the processing circuit comprises a visual representation showing the boundary of the active zone.

5. The electronic device of claim 4 wherein the visual representation showing the boundary of the active zone includes one or more drag handles for resizing or reshaping the border of the active zone.

6. The electronic device of claim 1 wherein the processing circuit is further configured to revert to a full screen touch mode when the electronic device is not held for a predetermined period of time, wherein in the full screen touch mode the active zone comprises the full display area of the touch screen.

7. The electronic device of claim 1 wherein the processing circuit is further configured to select a previously stored active zone based on a user preference.

8. A method implemented by an electronic device including a touch screen display configured to display a GUI and to generate touch input signals responsive to touch events, said method comprising:
   detecting an inadvertent touch event based on first touch input signals detected while in an active mode;
   switching, responsive to the inadvertent touch event, to a configuration mode;
   defining an active zone on said touch screen based on second touch input signals detected while in said configuration mode, wherein the active zone comprises less than the full display area of the touch screen;
   rearranging one or more interactive elements in the GUI so that the interactive elements in the GUI are displayed in the active zone;
   returning to said active mode;
   storing two or more active zones in a memory of said electronic device;
   detecting, while in the active mode, a change in how the electronic device is held; and
   automatically switching from a first previously stored active zone to a second previously stored active zone based detecting the change in how the electronic device is held.

9. The method of claim 8 wherein detecting the inadvertent touch event based on first touch input signals by detecting the presence of a user's hands or fingers on one area of the touch screen for more than a predetermined period of time.

10. The method of claim 8 wherein defining the active zone on said touch screen comprises:
    presenting a graphical tool set on said display, wherein said graphical tool set comprises a set of graphical tools for describing the active zone; and
    receiving said second touch input signals responsive to a user interacting with said graphical tool set.

11. The method of claim 10 wherein the graphical tool set presented on the display comprises a visual representation showing the boundary of the active zone.

12. The method of claim 11 wherein the visual representation showing the boundary of the active zone includes one or more handles for resizing or reshaping the border of the active zone.

13. The method of claim 8 further comprising reverting to a full screen touch mode when the electronic device is not held for a predetermined period of time, wherein in the full screen touch mode the active zone comprises the full display area of the touch screen.

14. The method of claim 8 further comprising selecting a previously stored active zone based on a user preference.

* * * * *